(12) United States Patent
Murata et al.

(10) Patent No.: US 6,385,400 B1
(45) Date of Patent: May 7, 2002

(54) MACRO ZOOM LENS SYSTEM

(75) Inventors: Masayuki Murata; Takayuki Ito, both of Saitama (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 56 days.

(21) Appl. No.: 09/657,101

(22) Filed: Sep. 7, 2000

(30) Foreign Application Priority Data

Sep. 8, 1999 (JP) .......................................... 11-254347

(51) Int. Cl.[7] .............................................. G03B 17/00
(52) U.S. Cl. .................... 396/79; 359/684; 359/687; 359/690; 359/693
(58) Field of Search .................... 396/79, 72; 359/687, 359/690, 693, 684

(56) References Cited

U.S. PATENT DOCUMENTS

| 5,528,423 A | 6/1996 | Arimoto et al. ............ 359/687 |
| 5,717,527 A | 2/1998 | Shibayama ................. 359/690 |
| 5,734,508 A | 3/1998 | Sato ............................ 359/687 |
| 5,793,531 A | 8/1998 | Shibayama ................. 359/686 |
| 5,920,435 A | 7/1999 | Shibayama ................. 359/686 |
| 6,128,140 A | * 10/2000 | Yoneyama ................. 359/687 |

* cited by examiner

*Primary Examiner*—W. B. Perkey
(74) *Attorney, Agent, or Firm*—Greenblum & Bernstein, P.L.C.

(57) ABSTRACT

A macro zoom lens system includes at least three lens groups, such as, a positive first lens group, a negative second lens group, and a positive third lens group, in this order from the object. Upon zooming, at least two lens groups are made moveable. On the other hand, upon focusing at any focal length in the focal-length range defined by the short focal length extremity and the long focal length extremity, any one of the lens groups other than the first lens group is made moveable. Furthermore, at the shortest object-to-image distance, an image magnification of more than ½ is obtained at the long focal length extremity.

5 Claims, 3 Drawing Sheets

MACRO ZOOM LENS SYSTEM

BACKGROUND OF THE INVENTION

1. Field of the Invention

The present invention relates to a zoom lens system for a single lens reflex camera, and in particular, to a macro zoom lens system which enables photographing an object at an extremely short distance.

2. Description of the Related Art

In the prior art, most of zoom lens systems with capability of short-distance photography are arranged to perform short-distance photographing at only one of the short focal length extremity and the long focal length extremity. Furthermore, in these zoom lens systems, zooming cannot be performed during short-distance photographing, which is inconvenient for a photographer from the viewpoint of operations for the camera. On the other hand, U.S. Pat. Nos. 5,528,423 and 5,734,508 have disclosed zoom lens systems with capability of short-distance photography over the entire focal length range. However, when short-distance photographing is being performed, the object distance, i.e., the first lens surface of the most object-side lens element to the object, becomes too short, thereby, the maximum image magnification inevitably becomes smaller, such as 0.25 to 0.3. Therefore a requirement for photographing an object larger is not satisfied.

In recent years, zoom lens systems with capability of short-distance photography over the entire focal length range and with the maximum image magnification of more than ½ have been disclosed in U.S. Pat. Nos. 5,920,435, 5,717,527 and 5,793,531. However, these zoom lens systems are the front-lens-group advancing type lens system in which the most object-side lens group which is the largest in size and the heaviest in weight is arranged to be advanced. Therefore requirements for miniaturization and weight reduction are not satisfied.

SUMMARY OF THE INVENTION

It is an object of the present invention to provide a macro zoom lens system which enables (i) short-distance photography over the entire focal length range, i.e., a full-range macro photography and (ii) miniaturization and weight reduction, and (iii) has a sufficient object distance even when the maximum image magnification is more than ½.

In order to achieve the above-mentioned object, there is provided a macro zoom lens system including at least three lens groups, such as, a positive first lens group, a negative second lens group, and a positive third lens group, in this order from the object. Upon zooming, at least two lens groups are made moveable. On the other hand, upon focusing at any focal length in the focal-length range defined by the short focal length extremity and the long focal length extremity, any one of the lens groups other than the first lens group is made moveable. Furthermore, at the shortest object-to-image distance, an image magnification of more than ½ is obtained at the long focal length extremity. The shortest object-to-image distance is defined as the shortest distance between the object and the image (image plane), which is inherent to a lens system under the condition that no accessories, such as a close-up lens element, an extension tube, bellows, etc., are used.

According to the above-explained macro zoom lens system, miniaturization and weight reduction can be achieved, since a lens group other than the first lens group is arranged to be a focusing lens group.

A four-lens-group macro zoom lens system can be obtained by providing positive fourth lens group, for example, on the image-side of the third lens group.

In both cases of the three-lens-group and four-lens-group macro zoom lens systems, focusing from infinity towards the shortest object-to-image distance can be performed by moving the second lens group.

In the case where the second lens group is the focusing lens group, the macro zoom lens system preferably satisfies the following condition:

$$0.3 < X_{FT}/(D_{ZT} - D_{ZW}) < 10 \tag{1}$$

wherein $X_{FT}$ designates the amount of advancing of the second lens group, at the long focal length extremity, from infinity towards the shortest object-to-image distance;

$D_{ZT}$ designates the distance between the second principal point of the first lens group and the first principal point of the second lens group at the long focal length extremity when photographing an object at an infinite distance; and $D_{ZW}$ designates the distance between the second principal point of the first lens group and the first principal point of the second lens group at the short focal length extremity when photographing an object at an infinite distance.

The macro zoom lens system can also satisfies the following condition:

$$-0.9 < m_T < 0 \tag{2}$$

wherein $m_T$ designates the magnification of the second lens group at the long focal length extremity when photographing an object at an infinite distance.

The present disclosure relates to subject matter contained in Japanese Patent Application No. Hei-11-254347 (filed on Sep. 8, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
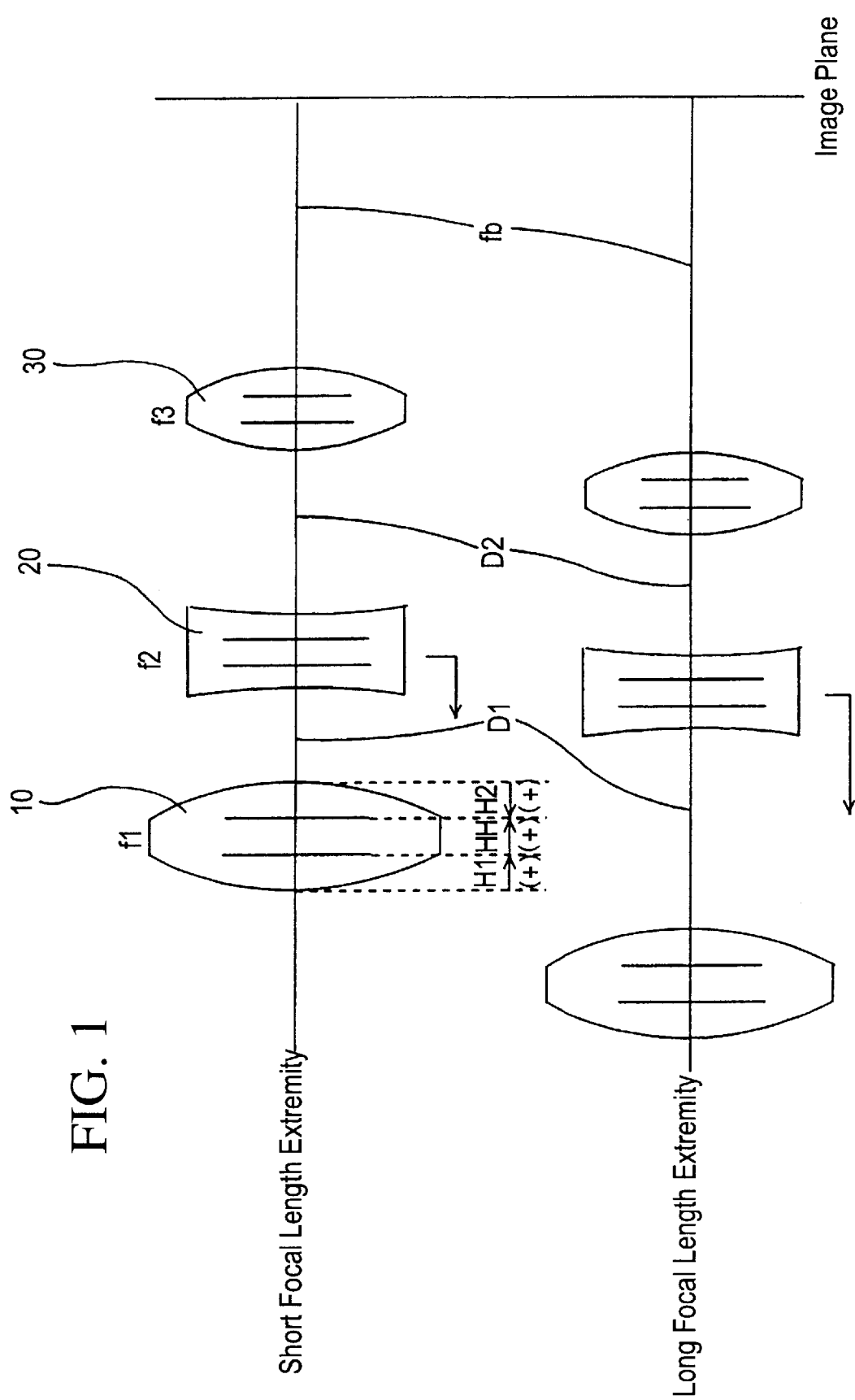
FIG. 1 is a schematic view which shows a position of each lens group of the three lens groups constituting the macro zoom lens system according to the present invention, respectively at the short focal length extremity and the long focal length extremity.

In the case where the macro zoom lens system is constituted by the three lens groups, there are provided, as shown in FIG. 1, a positive first lens group 10, a negative second lens group 20 and a positive third lens group 30, in this order from the object.

Figure 2:
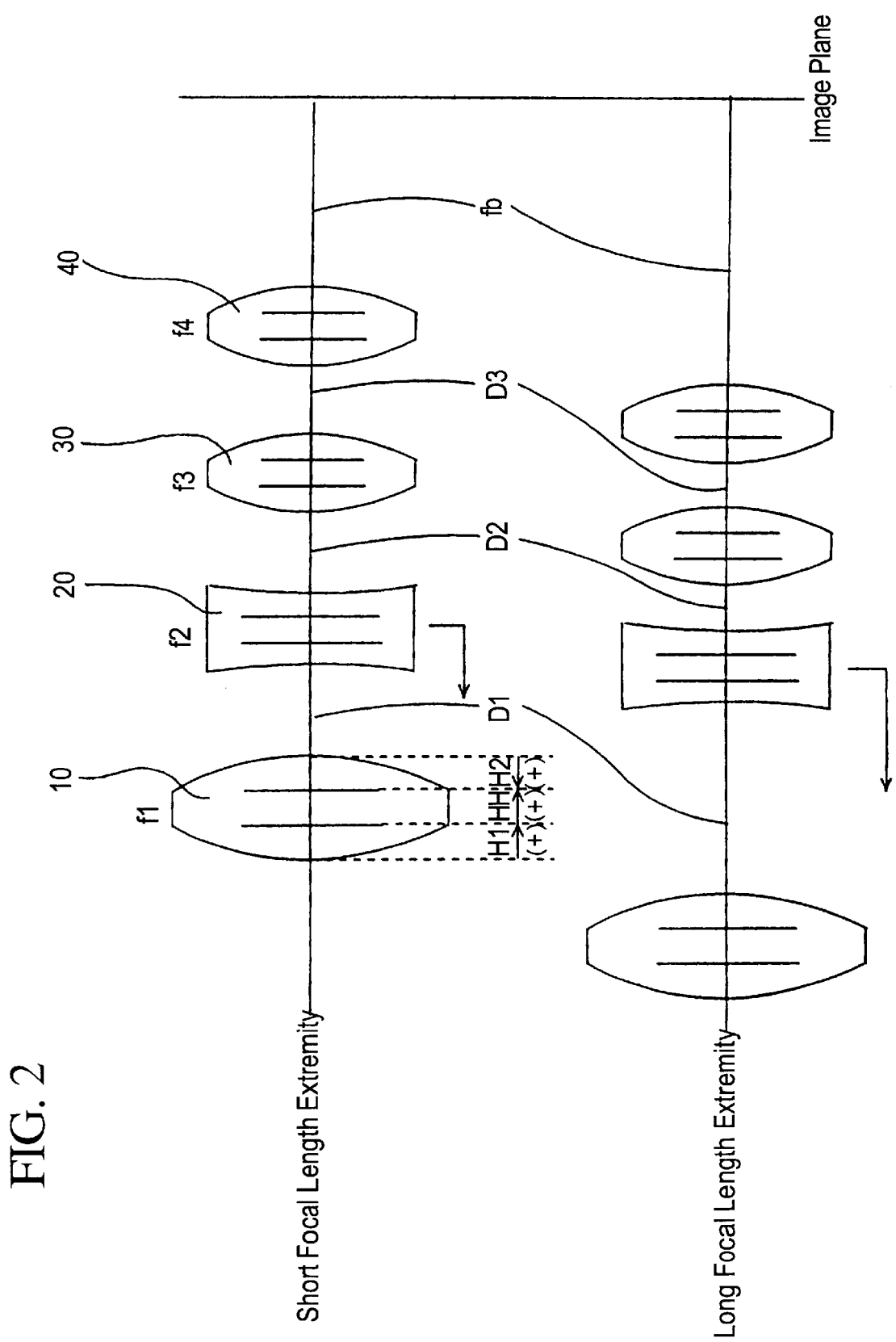
FIG. 2 is a schematic view which shows a position of each lens group of the four lens groups constituting the macro zoom lens system according to the present invention, respectively at the short focal length extremity and the long focal length extremity.

In the case where the macro zoom lens system is constituted by the four lens groups, there are provided, as shown in FIG. 2, a positive first lens group 10, a negative second lens group 20, a positive third lens group 30 and a positive fourth lens group 40, in this order from the object.

As shown in these drawings, in both cases of the three-lens-group arrangement and the four-lens-group arrangement, upon zooming from the short focal length extremity towards the long focal length extremity, all the lens groups are arranged to move towards the object, while at any focal length in the focal-length range defined by the short focal length extremity and the long focal length extremity, upon focusing from infinity towards the shortest object-to-image distance, the second lens group 20 is arranged to move towards the object. Furthermore, at the shortest object-to-image distance, an image magnification of more than ½ at the long focal length extremity can be obtained.

Condition (1) specifies the advancing-amount of the second lens group 20 upon focusing.

If $X_{FT}/(D_{ZT}-D_{ZW})$ exceeds the upper limit of condition (1), the magnification of the second lens group 20 at the short focal length extremity becomes large, and the traveling distance of the second lens group 20, upon focusing at the short focal length extremity, from infinity towards the shortest object-to-image distance becomes long, thereby the second lens group 20 may come into contact with the first lens group 10.

Likewise, if $X_{FT}/(D_{ZT}-D_{ZW})$ exceeds the upper limit of condition (1), at each focal length in the focal-length range defined by the short focal length extremity and the long focal length extremity, it becomes possible to make the magnification of the entire macro zoom lens system at the shortest object-to-image distance large; however, it becomes difficult to obtain the macro zoom lens system with a zoom ratio of more than 2.

If $X_{FT}/(D_{ZT}-D_{ZW})$ exceeds the lower limit of condition (1), the magnification of the second lens group 20 becomes too small, thereby at each focal length in the focal-length range defined by the short focal length extremity and the long focal length extremity, the magnification of the entire zoom lens system at the shortest object-to-image distance becomes small. For example, in the case of an optical system which exceeds the lower limit of condition (1), if an attempt is made, at the short focal length extremity, to make the image magnification larger up to about 0.3 to 0.4 at the shortest object-to-image distance, the object distance becomes too short, which is not preferable since macro (short-distance) photography becomes difficult.

Condition (2) specifies the magnification of the second lens group 20.

If $m_T$ exceeds the lower limit of condition (2), focusing cannot be performed by the second lens group 20.

If $m_T$ exceeds the upper limit of condition (2), it becomes impossible to constitute an optical system.

Specific embodiments will be herein discussed. In the tables, Effective FNO designates the effective F-number, f designates the focal length of the entire macro zoom lens system, fi (i=1 through 4) designates the focal length of the i$^{th}$ lens group, ω designates the half angle-of-view (°), H1 designates the position of the first principal point, H2 designates the position of the second principal point, and HH designates the distance between these principal points. D0 (the object distance) designates the distance between the first lens surface of the most object-side lens element and the object, D1 designates the distance between the most image-side surface of the first lens group 10 and the most object-side surface of the second lens group 20, D2 designates the distance between the most image-side surface of the second lens group 20 and the most object-side surface of the third lens group 30, D3 designates the distance between the most image-side surface of the third lens group 30 and the most object-side surface of the fourth lens group 40, and fb designates the back focal distance (the distance between the most image-side surface of the entire macro zoom lens system to the image plane). These symbols are also shown in FIGS. 1 and 2. The values corresponding to H1, H2 and HH are measured from the origin of each arrow in FIGS. 1 and 2, and the direction of arrow indicates the positive direction. In each Table, magnification is indicated as an absolute value.

[Embodiment 1]

Figure 4:
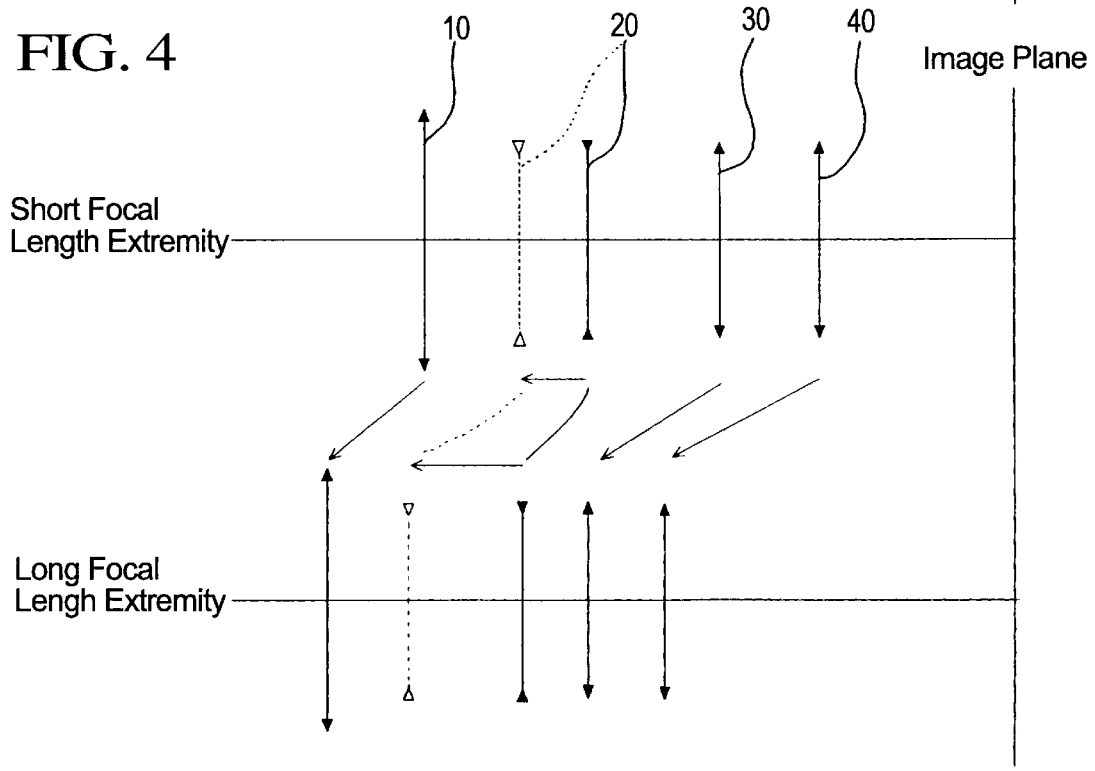
FIG. 4 shows the lens-group moving paths for the macro zoom lens system of the four lens groups according to the present invention.

Table 1 shows the data of the macro zoom lens system according to the first embodiment. The macro zoom lens system includes the four lens groups, i.e., the positive first lens group 10, a negative second lens group 20, the positive third lens group 30 and the positive fourth lens group 40, in this order from the object. As shown in FIG. 4, upon zooming from the short focal length extremity towards the long focal length extremity, all the lens groups are arranged to move towards the object, while at any focal length in the focal-length range defined by the short focal length extremity and the long focal length extremity, upon focusing from infinity towards the shortest object-to-image distance, the second lens group 20 is arranged to move towards the object. In FIG. 4, the second lens group 20 at the time of photographing an object at an infinite distance is shown by a solid line, while the second lens group 20 after having moved to the shortest object-to-image distance is shown by a dotted line.

TABLE 1

|  | Short Focal Length Extremity | | Intermediate Focal Length | | Long Focal Length Extremity | |
| --- | --- | --- | --- | --- | --- | --- |
|  | Infinity | S.O/I.D. | Infinity | S.O/I.D. | Infinity | S.O/I.D. |
| Effective FNO | 3.8 | 3.8 | 4.8 | 4.7 | 5.7 | 5.7 |
| f | 100 | — | 149.974 | — | 200 | — |
| Magnification | 0 | 0.34 | 0 | 0.51 | 0 | 0.71 |
| ω(half angle of view) | 11.9° | — | 8.0° | — | 6.1° | — |

|  | fi | H1 | HH | H2 |
| --- | --- | --- | --- | --- |
| First Lens Group | 160.66(f1) | 0.31 | 4.98 | 8.18 |
| Second Lens Group | −39.63(f2) | 6.57 | 4.24 | 3.99 |
| Third Lens Group | 56.95(f3) | 1.62 | 4.62 | 7.49 |
| Fourth Lens Group | 475.43(f4) | −208.23 | 73.63 | 162.46 |

|  | Short Focal Length Extremity | | Intermediate Focal Length | | Long Focal Length Extremity | |
| --- | --- | --- | --- | --- | --- | --- |
|  | Infinity | S.O/I.D. | Infinity | S.O/I.D. | Infinity | S.O/I.D. |
| O-I Distance | ∞ | 327.48 | ∞ | 327.48 | ∞ | 327.48 |
| D0 | ∞ | 141.58 | ∞ | 124.79 | ∞ | 107.47 |
| D1 | 23.93 | 3.63 | 30.69 | 7.41 | 33.18 | 7.66 |
| D2 | 17.97 | 38.28 | 8.11 | 31.39 | 2.51 | 28.03 |
| D3 | 34.63 | 34.63 | 36.23 | 36.23 | 36.81 | 36.81 |
| fb | 39.50 | 39.50 | 57.81 | 57.81 | 77.65 | 77.65 |
| Advancing Amount of 2nd Lens Group | 20.31 | 23.28 | 25.52 | | | |

Note:
S.O/I.D.: the shortest distance between the object and the image
O-I Distance: the distance between the object and the image

[Embodiment 2]

Table 2 shows the data of the macro zoom lens system according to the second embodiment. The basic lens arrangement, and the movement of each lens group upon zooming and focusing are the same as the first embodiment.

TABLE 2

| | Short Focal Length Extremity | | Intermediate Focal Length | | Long Focal Length Extremity | |
|---|---|---|---|---|---|---|
| | Infinity | S.O/I.D. | Infinity | S.O/I.D. | Infinity | S.O/I.D. |
| Effective FNO | 4 | 4 | 4.7 | 4.7 | 5.4 | 5.4 |
| f | 50 | — | 74.934 | — | 100 | — |
| Magnification | 0 | 0.37 | 0 | 0.53 | 0 | 0.7 |
| ω(half angle of view) | 22.9° | — | 15.70 | — | 11.9° | — |

| | fi | H1 | HH | H2 |
|---|---|---|---|---|
| First Lens Group | 92.75(f1) | 3.72 | 6.33 | 4.42 |
| Second Lens Group | −17.28 (f2) | 2.45 | 6.22 | 13.10 |
| Third Lens Group | 49.06(f3) | −6.76 | 5.76 | 13.51 |
| Fourth Lens Group | 54.08(f4) | −1.79 | 3.54 | 6.73 |

| | Short Focal Length Extremity | | Intermediate Focal Length | | Long Focal Length Extremity | |
|---|---|---|---|---|---|---|
| | Infinity | S.O/I.D. | Infinity | S.O/I.D. | Infinity | S.O/I.D. |
| O-I Distance | ∞ | 221.85 | ∞ | 221.85 | ∞ | 221.85 |
| D0 | ∞ | 70.11 | ∞ | 53.04 | ∞ | 38.60 |
| D1 | 14.03 | 7.80 | 21.45 | 13.49 | 26.60 | 16.98 |
| D2 | 10.19 | 16.42 | 5.33 | 13.29 | 2.42 | 12.04 |
| D3 | 4.62 | 4.62 | 4.02 | 4.02 | 3.74 | 3.74 |
| fb | 65.67 | 65.67 | 80.78 | 80.78 | 93.26 | 93.26 |
| Advancing Amount of 2nd Lens Group | 6.23 | | 7.96 | | 9.62 | |

Note:
S.O/I.D.: the shortest distance between the object and the image
O-I Distance: the distance between the object and the image

[Embodiment 3]

Table 3 shows the data of the macro zoom lens system according to the third embodiment. The basic lens arrangement, and the movement of each lens group upon zooming and focusing are the same as the first embodiment.

TABLE 3

| | Short Focal Length Extremity | | Intermediate Focal Length | | Long Focal Length Extremity | |
|---|---|---|---|---|---|---|
| | Infinity | S.O/I.D. | Infinity | S.O/I.D. | Infinity | S.O/I.D. |
| Effective FNO | 3.6 | 3.6 | 4.6 | 4.6 | 5.7 | 5.7 |
| f | 100.01 | — | 149.03 | — | 200 | — |
| Magnification | 0 | 0.34 | 0 | 0.52 | 0 | 0.76 |
| ω(half angle of view) | 11.9° | — | 8.1° | — | 6.1° | — |

| | fi | H1 | HH | H2 |
|---|---|---|---|---|
| First Lens Group | 177.80 (f1) | −1.10 | 5.04 | 9.38 |
| Second Lens Group | −41.67 (f2) | 6.72 | 4.22 | 3.83 |
| Third Lens Group | 58.09 (f3) | 1.18 | 5.63 | 9.53 |
| Fourth Lens Group | 388.11 (f4) | −170.03 | 61.27 | 134.95 |

TABLE 3-continued

| | Short Focal Length Extremity | | Intermediate Focal Length | | Long Focal Length Extremity | |
|---|---|---|---|---|---|---|
| | Infinity | S.O/I.D. | Infinity | S.O/I.D. | Infinity | S.O/I.D. |
| O-I Distance | ∞ | 336.15 | ∞ | 336.15 | ∞ | 336.15 |
| D0 | ∞ | 146.00 | ∞ | 129.76 | ∞ | 111.13 |
| D1 | 25.23 | 4.87 | 29.65 | 7.17 | 29.28 | 5.21 |
| D2 | 18.08 | 38.45 | 8.06 | 30.54 | 2.51 | 26.57 |
| D3 | 36.72 | 36.72 | 37.54 | 37.54 | 36.85 | 36.85 |
| fb | 39.51 | 39.51 | 60.54 | 60.54 | 85.77 | 85.77 |
| Advancing Amount of 2nd Lens Group | 20.36 | | 22.48 | | 24.06 | |

Note:
S.O/I.D.: the shortest distance between the object and the image
O-I Distance: the distance between the object and the image

[Embodiment 4]

Table 4 shows the data of the macro zoom lens system according to the fourth embodiment. The basic lens arrangement, and the movement of each lens group upon zooming and focusing are the same as the first embodiment.

TABLE 4

| | Short Focal Length Extremity | | Intermediate Focal Length | | Long Focal Length Extremity | |
|---|---|---|---|---|---|---|
| | Infinity | S.O/I.D. | Infinity | S.O/I.D. | Infinity | S.O/I.D. |
| Effective FNO | 4.2 | 4.2 | 5.1 | 5.1 | 5.9 | 5.9 |
| f | 50 | — | 74.016 | — | 100 | — |
| Magnification | 0 | 0.36 | 0 | 0.52 | 0 | 0.7 |
| ω(half angle of view) | 23.2° | — | 15.9° | — | 11.9° | — |

| | fi | H1 | HH | H2 |
|---|---|---|---|---|
| First Lens Group | 108.71 (f1) | 1.03 | 4.81 | 6.61 |
| Second Lens Group | −17.11 (f2) | 3.32 | 6.79 | 11.74 |
| Third Lens Group | 52.54 (f3) | −5.71 | 5.23 | 13.42 |
| Fourth Lens Group | 51.33 (f4) | −1.30 | 3.54 | 6.22 |

| | Short Focal Length Extremity | | Intermediate Focal Length | | Long Focal Length Extremity | |
|---|---|---|---|---|---|---|
| | Infinity | S.O/I.D. | Infinity | S.O/I.D. | Infinity | S.O/I.D. |
| O-I Distance | ∞ | 240.37 | ∞ | 240.37 | ∞ | 240.37 |
| D0 | ∞ | 81.83 | ∞ | 60.60 | ∞ | 41.50 |
| D1 | 11.30 | 6.37 | 21.06 | 14.64 | 27.57 | 19.65 |
| D2 | 9.36 | 14.28 | 5.19 | 11.61 | 2.42 | 10.34 |
| D3 | 7.73 | 7.73 | 4.04 | 4.04 | 6.78 | 6.78 |
| fb | 74.47 | 74.47 | 90.78 | 90.78 | 106.41 | 106.41 |
| Advancing Amount of 2nd Lens Group | 4.93 | | 6.42 | | 7.93 | |

Note:
S.O/I.D.: the shortest distance between the object and the image
O-I Distance: the distance between the object and the image

[Embodiment 5]

Figure 3:
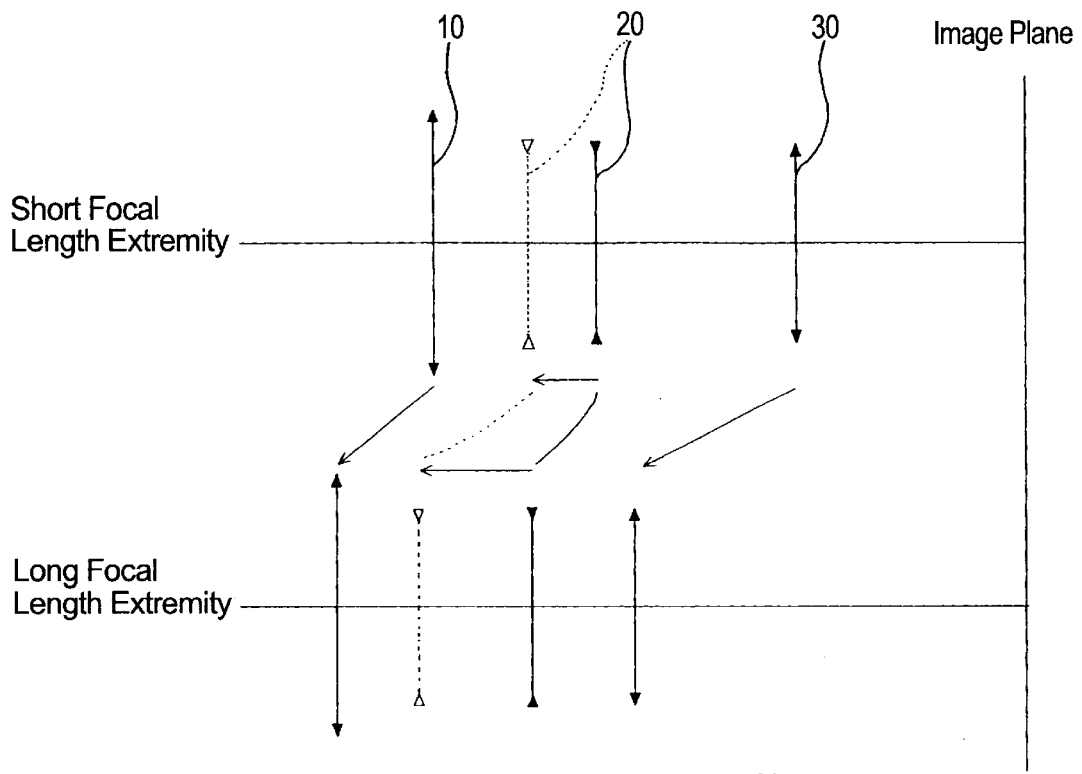
FIG. 3 shows the lens-group moving paths for the macro zoom lens system of the three lens groups according to the present invention.

Table 5 shows the data of the macro zoom lens system according to the fifth embodiment. The macro zoom lens system includes the three lens groups, i.e., the positive first lens group 10, the negative second lens group 20, and the positive third lens group 30, in this order from the object. As shown in FIG. 3, upon zooming from the short focal length extremity towards the long focal length extremity, all the lens groups are arranged to move towards the object, while at any focal length in the focal-length range defined by the short focal length extremity and the long focal length extremity, upon focusing from infinity towards the shortest object-to-image distance, the second lens group 20 is arranged to move towards the object. In FIG. 3, the second lens group 20 at the time of photographing an object at an infinite distance is shown by a solid line, while the second lens group 20 after having moved to the shortest object-to-image distance is shown by a dotted line.

TABLE 5

|  | Short Focal Length Extremity | | Intermediate Focal Length | | Long Focal Length Extremity | |
| --- | --- | --- | --- | --- | --- | --- |
|  | Infinity | S.O/I.D. | Infinity | S.O/I.D. | Infinity | S.O/I.D. |
| Effective FNO | 4 | 4 | 4.4 | 4.4 | 5.7 | 5.7 |
| f | 100 | — | 126.474 | — | 200 | — |
| Magnification | 0 | 0.36 | 0 | 0.44 | 0 | 0.71 |
| ω(half angle of view) | 11.8° | — | 9.43° | — | 6.1° | — |

|  | fi | H1 | HH | H2 |
| --- | --- | --- | --- | --- |
| First Lens Group | 129.45 (f1) | 3.16 | 3.84 | 4.29 |
| Second Lens Group | −33.06 (f2) | 7.03 | 3.68 | 3.58 |
| Third Lens Group | 37.85 (f3) | −6.46 | 31.30 | 56.11 |

|  | Short Focal Length Extremity | | Intermediate Focal Length | | Long Focal Length Extremity | |
| --- | --- | --- | --- | --- | --- | --- |
|  | Infinity | S.O/I.D. | Infinity | S.O/I.D. | Infinity | S.O/I.D. |
| O-I Distance | ∞ | 326.98 | ∞ | 326.98 | ∞ | 326.98 |
| D0 | ∞ | 145.45 | ∞ | 135.65 | ∞ | 108.99 |
| D1 | 19.77 | 4.18 | 24.01 | 6.70 | 30.26 | 9.10 |
| D2 | 15.74 | 31.33 | 10.75 | 28.06 | 2.51 | 23.67 |
| fb | 39.50 | 39.50 | 50.05 | 50.05 | 78.71 | 78.71 |
| Advancing Amount of 2nd Lens Group | 15.59 | | 17.31 | | 21.16 | |

Note:
S.O./I.D.: the shortest distance between the object and the image
O-I Distance: the distance between the object and the image Table 6 shows the numerical values of each condition of each embodiment.

TABLE 6

|  | Condition (1) | Condition (2) |
| --- | --- | --- |
| Embodiment 1 | 2.759 | −0.542 |
| Embodiment 2 | 0.766 | −0.412 |
| Embodiment 3 | 5.947 | −0.459 |
| Embodiment 4 | 0.487 | −0.316 |
| Embodiment 5 | 2.019 | −0.603 |

As can be understood from Table 6, each embodiment satisfies each condition.

According to the above description, a macro zoom lens system, which enables short-distance photography over the entire focal length range, i.e., a full-range macro photography, and the maximum image magnification of more than ½, can be obtained. In particular, since the macro zoom lens system is an inner-focus type lens system in which an intermediate lens group (the second lens group) is the focusing lens group, the macro zoom lens system can further achieve miniaturization and weight reduction than the front-lens-group advancing type lens system in which the most object-side lens group (the first lens group) is the focusing lens group can.

What is claimed is:

1. A macro zoom lens system comprising at least three lens groups of a positive first lens group, a negative second lens group, and a positive third lens group, in this order from an object;

wherein upon zooming, at least two lens groups are made moveable;

wherein upon focusing at any focal length in a focal-length range defined by the short focal length extremity and the long focal length extremity, any one of said lens groups other than said first lens group is made moveable; and wherein at the shortest object-to-image distance, an image magnification of more than ½ is obtained at the long focal length extremity.

2. The macro zoom lens system according to claim 1, further comprising a positive fourth lens group which is provided on the image-side of said third lens group.

3. The macro zoom lens system according to claim 1, wherein focusing from infinity towards the shortest object-to-image distance is performed by moving said second lens group.

4. The macro zoom lens system according to claim 3, satisfying the following condition:

$$0.3 < X_{FT}/(D_{ZT} - D_{ZW}) < 10$$

wherein $X_{FT}$ designates the amount of advancing of said second lens group, at the long focal length extremity, from infinity towards the shortest object-to-image distance;

$D_{ZT}$ designates the distance between the second principal point of said first lens group and the first principal point of said second lens group at the long focal length extremity when photographing said object at an infinite distance; and $D_{ZW}$ designates the distance between the second principal point of said first lens group and the first principal point of said second lens group at the short focal length extremity when photographing said object at an infinite distance.

5. The macro zoom lens system according to claim 3, satisfying the following condition:

$$-0.9 < m_T < 0$$

wherein $m_T$ designates the magnification of said second lens group at the long focal length extremity when photographing said object at an infinite distance.

* * * * *